United States Patent
Shen

(10) Patent No.: US 12,529,021 B2
(45) Date of Patent: *Jan. 20, 2026

(54) UNIT DOSE CAPSULE

(71) Applicant: Conopco, Inc., Englewood Cliffs, NJ (US)

(72) Inventor: Jun Shen, Shanghai (CN)

(73) Assignee: Conopco, Inc., Englewood Cliffs, NJ (US)

( * ) Notice: Subject to any disclaimer, the term of this patent is extended or adjusted under 35 U.S.C. 154(b) by 200 days.

This patent is subject to a terminal disclaimer.

(21) Appl. No.: 18/012,052

(22) PCT Filed: Jun. 22, 2021

(86) PCT No.: PCT/EP2021/066970
§ 371 (c)(1),
(2) Date: Dec. 21, 2022

(87) PCT Pub. No.: WO2022/002692
PCT Pub. Date: Jan. 6, 2022

(65) Prior Publication Data
US 2023/0313085 A1    Oct. 5, 2023

(30) Foreign Application Priority Data

Jul. 3, 2020  (WO) ................ PCT/CN2020/100181
Aug. 13, 2020  (EP) .................................... 20190805

(51) Int. Cl.
*C11D 17/04* (2006.01)
*B29C 51/00* (2006.01)
(Continued)

(52) U.S. Cl.
CPC .......... *C11D 17/045* (2013.01); *B29C 51/002* (2013.01); *B29C 51/10* (2013.01);
(Continued)

(58) Field of Classification Search
None
See application file for complete search history.

(56) References Cited

U.S. PATENT DOCUMENTS

2016/0130538 A1    5/2016    Cooley et al.
2017/0355934 A1    12/2017   Courchay et al.
(Continued)

FOREIGN PATENT DOCUMENTS

CA    153023    2/2015
CA    169319    6/2018
(Continued)

OTHER PUBLICATIONS

European Search Report in corresponding European Patent Application No. EP20190812, dated Feb. 8, 2021.
(Continued)

*Primary Examiner* — Abbas Rashid
*Assistant Examiner* — Adrianna N Konves
(74) *Attorney, Agent, or Firm* — Carter, DeLuca & Farrell, LLP; George Likourezos; Bret P. Shapiro

(57) ABSTRACT

The present invention provides a method of producing a unit dose capsule for treatment of a substrate comprising the steps of a. placing a first sheet of water-soluble polyvinyl alcohol film over a mould having sets of cavities, each set comprising three cavities arranged on the sealing plane one after the other in circumferential direction such that footprint area of the second and the third compartments is from 0.8 to 2.5 times the area of the footprint of the first compartment; b. heating and applying vacuum to the film to mould the film into the cavities and hold it in place to form three recesses in the film; a first recess, the second recess, and a third recess, the three recesses being connected to respective side recesses by the film; c. filling three different parts of a substrate treatment composition into the three recesses, the (Continued)

three parts together forming a full substrate treatment composition; d. sealing a second sheet of film to the first sheet of film across the formed recesses to form the sealing web comprising a peripheral sealing skirt and inter-compartment sealing webs; and e. cutting between the capsules so that a series of three compartment capsules are formed, each capsule containing a part of a substrate treatment composition in three compartments.

13 Claims, 3 Drawing Sheets

(51) Int. Cl.
    *B29C 51/10*      (2006.01)
    *B29C 51/26*      (2006.01)
    *B29C 65/00*      (2006.01)
    *B29C 65/02*      (2006.01)
    *B29C 65/78*      (2006.01)
    *B65D 65/46*      (2006.01)
    *B65D 75/32*      (2006.01)
    *B29K 29/00*      (2006.01)
    *B65B 61/06*      (2006.01)

(52) U.S. Cl.
    CPC ............ *B29C 51/266* (2013.01); *B29C 65/02* (2013.01); *B29C 65/7847* (2013.01); *B29C 66/73793* (2013.01); *B65D 65/46* (2013.01); *B65D 75/323* (2013.01); *B29K 2029/04* (2013.01); *B29K 2995/0062* (2013.01); *B65B 61/06* (2013.01); *B65D 2221/00* (2013.01); *C11D 2111/12* (2024.01)

(56) References Cited

U.S. PATENT DOCUMENTS

| | | | |
|---|---|---|---|
| 2018/0282672 | A1 | 10/2018 | Meier et al. |
| 2018/0282673 | A1* | 10/2018 | Meier ................... B65D 65/46 |
| 2019/0316066 | A1 | 10/2019 | Ellson et al. |
| 2020/0131457 | A1 | 4/2020 | Depoot et al. |
| 2022/0325210 | A1 | 10/2022 | Adams et al. |
| 2023/0235255 | A1 | 7/2023 | Dai et al. |

FOREIGN PATENT DOCUMENTS

| | | |
|---|---|---|
| CA | 170642 | 7/2018 |
| CA | 179292 | 5/2019 |
| CA | 182615 | 8/2019 |
| CA | 182616 | 8/2019 |
| CN | 105307941 A | 2/2016 |
| CN | 108688983 A | 10/2018 |
| CN | 108688999 A | 10/2018 |
| CN | 109923200 A | 6/2019 |
| CN | 201930505331 | 4/2020 |
| CN | 115735003 A | 3/2023 |
| CN | 115867634 A | 3/2023 |
| DE | 102014102567 A1 | 7/2015 |
| DM | 200219 | 6/2018 |
| DM | 202206 | 7/2018 |
| EM | 005233053-0001 | 4/2018 |
| EM | 006120549-0001 | 2/2019 |
| EM | 005247582-0002 | 4/2019 |
| EM | 006531166-0001 | 6/2019 |
| EM | 006760658-0001 | 8/2019 |
| EP | 1375637 A1 | 1/2004 |
| EP | 1394065 A1 | 3/2004 |
| EP | 001785361-0006 | 1/2013 |
| EP | 2617659 A1 | 7/2013 |
| EP | 003042696-0066 | 10/2016 |
| EP | 3381834 | 10/2018 |
| EP | 3381835 A1 | 10/2018 |
| EP | 3381836 | 10/2018 |
| EP | 005247582-0001 | 4/2019 |
| EP | 006612891-0001 | 7/2019 |
| MY | 20-E0657-0202 | 5/2020 |
| WO | 0055045 A1 | 9/2000 |
| WO | 2014170882 A1 | 10/2014 |
| WO | 2018086834 A1 | 5/2018 |
| WO | 2020152044 A1 | 7/2020 |
| WO | 2021063560 A1 | 4/2021 |

OTHER PUBLICATIONS

European Search Report in corresponding European Patent Application No. EP20190809, dated Feb. 8, 2021.
International Search Report and Written Opinion in corresponding Internattional PCT Application No. PCT/EP2021/066428, dated Aug. 31, 2021.
European Search Report in corresponding European Patent Application No. EP20190805, dated Feb. 3, 2021 (8 pages).
International Search Report and Written Opinion in corresponding International PCT Application No. PCT/EP2021/066472, dated Aug. 31, 2021 (10 pages).
International Search Report and Written Opinion in corresponding International PCT Application No. PCT/EP2021/066970, dated Aug. 31, 2021 (12 pages).
"Spheroid", https://en.Wikipedia.org/w/index.php?title=Spheroid &oldid=957515960, retrieved on Jul. 31, 2024, 6 pages.
Mintel, "Breeze Capsule Clean & Hygiene 3 in 1 Concentrated Liquid Detergent Capsules", GNPD Record ID 7557613, Apr. 2020, 1 page.
European Patent Office, Communication Pursuant to Rule 114(2) EPC issued in European Patent Application No. 21731825.2, dated Aug. 6, 2024, 5 pages.
Thanakit Phophuet, "USA and me", available at https://www.youtube.com/watch?v=9GPlh-fS3sQ, Apr. 23, 2020, 1 page.
Unilever, Half oblate and prolate spheroid side view visualization, date unknown, unpublished, 1 page.
Notice of Opposition dated Dec. 10, 2024 issued in corresponding European Patent Application No. 21733468.9, 23 pages.
Notice of Opposition dated Dec. 2, 2024 issued in corresponding European Patent Application No. 21733468.9, 25 pages.
Notice of Opposition dated Dec. 3, 2024 issued in corresponding European Patent Application No. 21733439.0, 20 pages.
Notice of Opposition dated Dec. 11, 2024 issued in corresponding European Patent Application No. 21733439.0, 22 pages.
Notice of Opposition dated Jan. 2, 2025 issued in corresponding European Patent Application No. EP21731825.2, 21 pages.
Notice of Opposition dated Jun. 2, 2025 issued in corresponding European Patent Application No. EP21731825.2, 33 pages.
Notice of Opposition dated Jun. 3, 2025 issued in corresponding European Patent Application No. EP21731825.2, 31 pages.

* cited by examiner

UNIT DOSE CAPSULE

FIELD OF THE INVENTION

The present invention is related to a unit dose capsule containing substrate treatment composition for treating a substrate and more specifically for treating a fabric or dishes.

BACKGROUND OF THE INVENTION

Multi-compartment water-soluble detergent capsules made with water-soluble film are known. The water soluble-film is typically polyvinyl alcohol. The preferred capsule manufacturing process involves thermoforming the film. By thermoforming is meant a process in which a first sheet of film is subjected to a moulding process to form recesses in the film. The process involves heating the film to soften it and also the application of vacuum to hold the film in the moulds. The recesses are then filled. The capsules are completed by overlaying a second sheet over the filled recesses and sealing it to the first sheet of film around the edges of the recesses to form a flat sealing web.

Relaxation of the first film typically then causes the applied second sheet to bulbous out when the vacuum is released from the first sheet of film in the mould. The capsules are cut apart to leave part of the flat sealing web as an peripheral "skirt" around each capsule when it is removed from the mould. Although the sealing web is flat when in the mould it may deform a little when removed from the mould. Likewise the profile of the capsule usually relaxes slightly away from having a "mould perfect" profile after it is released from the mould. To the extent that this specification refers to flat sealing webs and/or a sealing plane associated with the sealing web, the reference is to a sealing web that is moulded flat. Similarly, to the extent that this specification refers to aspects of a capsule's shape or configuration, the reference is to capsules that are formed in moulds having that shape or configuration. Nevertheless, some aspects of shape and configuration can be embodied in the capsule itself, for example as a result of the relaxation of the film associated with each compartment, and the effect of the liquid compositions within the compartments.

Multi-compartment capsules are suited for delivery of main wash laundry compositions to automatic washing machines and even for hand wash applications. Although a multi-compartment configuration is more difficult to manufacture than a single compartment it may be chosen because components of the detergent composition need to be mixed at point of use and/or have reduced stability when stored together. It may also give the capsule aesthetic appeal because the different compartments can be filled with different appearance contents.

Multi-compartment water-soluble detergent capsules comprising from 2 to 5 compartments obtained by thermo-forming a water-soluble film are disclosed in EP1375637 and EP1394065 (Unilever). One compartment may contain a liquid part of the detergent composition and another compartment a granular part of the composition, such as bleach or builder. A problem with capsules having their compartments separated by a flat sealing web 104 that extends across the capsule as described in most of the embodiments disclosed is that they are floppy because they will fold up along the flat seal, causing a portion of the capsule to droop. This folding has been found to cause handling problems and a floppy capsule is not liked by consumers.

The product sold as "Tide Pods" or "Ariel Pods", is assembled from two thermoformed "capsules" to form a multi-compartment capsule whereby a first "capsule" having two smaller liquid compartments joined together with foldable flat seals is then used to seal (close) a larger compartment. This stacked configuration prevents the seals from folding. However, this approach suffers from the disadvantages of a complex manufacturing process and having a seal area with triple layers of film. To avoid dissolution problems resulting from such triple layer seals it is necessary to use thinner than normal film, which leads to issues with leakage due to pin-holing of the thinner film elsewhere in the capsules during manufacture.

Polyvinylalcohol film cannot completely prevent migration of the contents of one liquid compartment into another. In any capsule where there is a liquid compartment separated from other ingredients only by a single thin layer of polyvinylalcohol film the ability to effectively segregate ingredients that need to be kept apart until use is inevitably compromised. For example in the "Tide Pod" capsule, only the contents of the two smaller liquid compartments can be considered to be effectively segregated.

WO 2014/170882 (Rideau) discloses three compartment capsules wherein the compartments are arranged such that there is only ever one seal running from one side of the product to the other. The designs usually consist of a central compartment which is not just partnered by side compartments but is actually surrounded by them. This is a solution to the problem of drooping in multi-compartment capsules. The only design where the seal passes from one side to the other without splitting is FIG. 14 which is a dual compartment system. In all other designs a central compartment is used to provide stability against the drooping problem.

The drooping problem applies also to the commercially available "3-in-1" capsule sold by El Corte Ingles (Spain), a schematic illustration of which is provided in FIG. 3. This capsule 301 has a rectangular skirt 302 and three substantially equally-sized, straight-sided compartments 303, 304, 305.

A further "real world" issue with water-soluble detergent capsules, including those used in automatic laundry washing machines, is that consumers do not read the instructions for their use carefully and therefore may use them incorrectly. They are known to put the capsule into the washing machine dispensing drawer when it should be added directly to the drum and they are also known to use capsules in overloaded water conserving washing machines where the capsule may then be exposed to a comparatively small amount of water. And so rapid and complete dissolution of the capsule and mixing of the compositions from different compartments is important. Indeed, incomplete dissolution of the water-soluble film can be a problem particularly where the peripheral skirt—which is comparatively thick because it is formed from two sheets of film—is wide and/or has substantial corners. Incomplete dissolution can cause film residue to be left on the garments. Indeed, dissolution can be further hampered where, in the early stages of a wash cycle or on placing the capsule on the garments to be washed, the film adheres to a garment because dissolution of the adhered or partially embedded film more difficult. The problem of film sticking or becoming entangled with a garment may be greater if the skirt is wide and/or has substantial corners.

US 2018/0282673 A1 (Henkel) discloses a detergent product for treating textiles, including a film pouch having a plurality of pouch chambers which are each enclosed by at least one water-soluble film, wherein the pouch chambers are formed by water-soluble films connected to one another in a sealing sections located in the sealing plane and are separated from one another by sealing sections located in the sealing plane, and wherein the pouch chambers are each filled with a detergent preparation.

WO 2020/152044 A1 (Reckitt Benckiser) discloses a method of forming an automatic dishwashing pouch comprising the steps of: providing a sheet of material; identifying one or more regions of the material; heating the material with a heating device having a non-uniform heating profile, the non-uniform heating profile arranged to heat the identified region(s) to a greater temperature than other regions of the material; and forming the material in a mould to form the automatic dishwashing pouch, the automatic dishwashing pouch including a plurality of cavities.

WO2018/086834 (Unilever) seeks to address one or more of the problems noted above and/or seek to provide improved capsules especially in connection with material and energy efficiency in production; handling; the consumer experience; and in-use performance.

It is seen that a lot of problems are faced in the production of capsules, especially the speed, frequent leakages are seen during transportation. Also, despite capsules being used for sometime now, it is frequently seen that there are problems with the cleaning efficiency, such as capsules getting trapped in the clothes resulting in improper cleaning and stained clothes. It is frequently seen that capsules are either too fragile break frequently before their intended purpose is served or sometimes are too sloppy that they fold and leak.

SUMMARY OF THE INVENTION

In a first aspect of the present invention provides a method of producing a unit dose capsule (101) for treatment of a substrate, the method comprising steps:
a. placing a first sheet of water-soluble polyvinyl alcohol film over a mould having sets of cavities, each set comprising three cavities arranged on the sealing plane one after the other in circumferential direction wherein combined footprint area of the second and the third compartments is from 0.8 to 2.5 times the area of the footprint of the first compartment;
b. heating and applying vacuum to the film to mould the film into the cavities and hold it in place to form three recesses in the film; a first recess, the second recess, and a third recess, the three recesses being connected to respective side recesses by the film;
c. filling three different parts of a substrate treatment composition into the three recesses, the three parts together forming a full substrate treatment composition;
d. sealing a second sheet of film to the first sheet of film across the formed recesses to form the sealing web comprising a peripheral sealing skirt and inter-compartment sealing webs; and
e. cutting between the capsules so that a series of three compartment capsules are formed, each capsule containing a part of a substrate treatment composition in three compartments.

In a second aspect, the present invention is directed to a unit dose capsule for treatment of a substrate obtained or obtainable by the method of the first aspect of this invention.

These and other aspects of the present invention will more readily become apparent upon considering the detailed description and examples which follow.

DETAILED DESCRIPTION OF THE INVENTION

Figure 1:
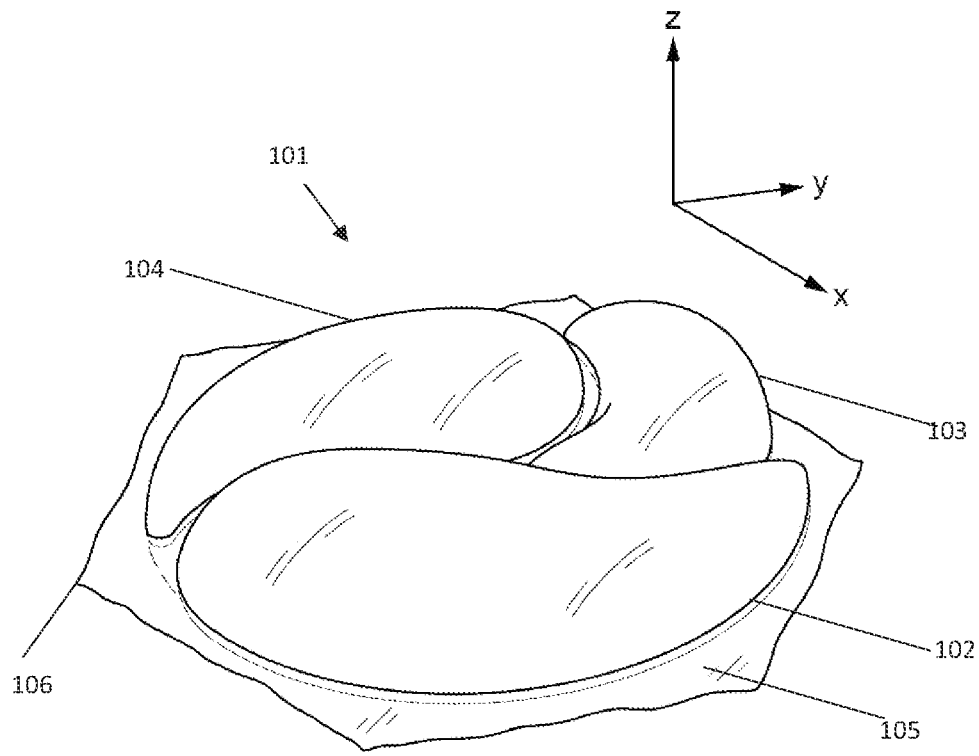
FIG. 1 is a perspective view of the capsule in accordance with the present invention.

Except in the examples, or where otherwise explicitly indicated, all numbers in this description indicating amounts of material or conditions of reaction, physical properties of materials and/or use may optionally be understood as modified by the word "about".

It should be noted that in specifying any range of values, any particular upper value can be associated with any particular lower value.

For the avoidance of doubt, the word "comprising" is intended to mean "including" but not necessarily "consisting of" or "composed of". In other words, the listed steps or options need not be exhaustive.

The disclosure of the invention as found herein is to be considered to cover all embodiments as found in the claims as being multiply dependent upon each other irrespective of the fact that claims may be found without multiple dependency or redundancy.

Where a feature is disclosed with respect to a particular aspect of the invention (for example a product of the invention), such disclosure is also to be considered to apply to any other aspect of the invention (for example a process of the invention) mutatis mutandis.

"Unit dose capsule" described herein is a capsule preferably intended for one-time use, preferably for laundry wash or dishes and more preferably for laundry wash.

The term 'surface extension ratio' as herein described is the surface area of the film above the sealing plane to surface area of footprint the compartments located in the sealing plane.

The present invention provides a unit dose capsule for treatment of a substrate, the capsule comprising a first, second and a third compartment containing a substrate treatment composition, wherein the capsule is formed from two sheets of water-soluble film, the two sheets of film being sealed together forming a sealing web lying in a sealing plane, the first, the second and the third compartments arranged in the sealing plane and describing a first, second and third compartment footprint on said sealing plane, wherein combined footprint area of the second and the third compartments is from 0.8 to 2.5 times the area of the footprint of the first compartment.

The inventors have surprisingly found that keeping the combined footprint area of the second and the third compartments is from 0.8 to 2.5 times the area of the footprint of the first compartment has many advantages than having substantially equal sized compartments or choosing the footprint on a random basis. It was seen that the unit dose capsule according to the present invention was much stable during production, transport and consumer usage as the capsule was more sturdy, at the same time, the capsule acquired appropriate properties to release the contents of the compartments at just the appropriate time during the wash cycle. It was observed that deviation from the sizing of the footprints according to the present invention lead to unsatisfactory wash results and if combined footprint area of the second and the third compartments is higher than 2.5 times the area of the footprint of the first compartment or lower than 0.8, the resulting capsule is a floppy capsule which is highly susceptible to folding and consequently leading to leakages and breakage and poor wash results.

Unit Dose Capsule

The aspects of the invention described herein provide a unit dose capsule for treatment of a substrate, the capsule comprising a first, second and a third compartment containing a substrate treatment composition, wherein the capsule is formed from two sheets of water-soluble film, the two sheets of film being sealed together forming a sealing web lying in a sealing plane, the first, the second and the third compartments arranged in the sealing plane and describing a first, second and third compartment footprint on said sealing plane, wherein combined footprint area of the second and the third compartments is from 0.8 to 2.5 times the area of the footprint of the first compartment.

It is preferred that the footprint size of the compartment located in the sealing plane increases linearly. In other words the three compartments have foot prints as large, medium and small sized, which is to say that the compartments preferably do not have equal sized foot prints and highly preferably as large medium and small.

It is preferred that the footprints of the compartments located in the sealing plane has the largest dimension in the range of 10 mm to 60 mm.

It is preferred that the sealing web may comprise a generally square, rectangle, hexagonal or annular peripheral sealing web, the sealing web comprises a preferably generally annular or square sealing web defining the periphery of the capsule, and more preferably a square sealing web extending across the capsule, serving to connect the compartments and to separate the contents of the compartments.

It is preferred that the sealing web comprises a generally annular or square sealing web, the sealing web defining an outwardly-facing edge of each of the three compartments, wherein the profile of said outwardly-facing edge of each of the three compartments is substantially continuously curved. That is, each outwardly-facing edge is curved for substantially its entire length.

It is preferred that the compartments has a concave recess on the side where the compartment faces other compartments and preferably towards inside facing a central axis of the capsule, and each compartment has a convex portion. It is preferred that the compartments have a concave recess on the side where the compartment faces other compartments and preferably towards inside facing a central axis of the capsule, and each compartment has a convex portion facing the periphery of the capsule. The term 'central axis' as used herein refers to an imaginary axis running through the center of the capsule perpendicular to the direction of sealing plane.

It is preferred that the compartments are of a shape to utilize the maximum space of the capsule, such that the recess of one accommodates the bulbous of another compartment. The compartments may be of any shape and preferably the footprints of the compartments located in the sealing plane are droplet-shaped, comma shape, leaf-shaped, yin-and-yang-shaped or similar shaped and may be of all different shapes or same shapes but different sizes, or a combination of different shapes, it is highly preferable that all the three compartments are of same shape.

It is preferred that first compartment is droplet shaped having a tapered end portion top, a bulbous portion at its bottom, a concave recess facing central axis of the capsule and a convex portion facing the periphery of the capsule; the second is shaped so as conform to and be at least partially located in a concave recess of the first compartment, and the third one is so located as to accommodate at least partially the bulbous portion of the first compartment.

It is highly preferred that the second compartment is droplet shaped having a tapered end portion top, a bulbous portion at its bottom, a concave recess facing central axis of the capsule and a convex portion facing the periphery of the capsule such that at least partially the bulbous portion of second compartment is accommodated in the concave recess of the first compartment.

It is most preferred that the third compartment is droplet shaped having a tapered end portion top, a bulbous portion at its bottom, a concave recess facing central axis of the capsule and a convex portion facing the periphery of the capsule such that at least partially the bulbous portion of first compartment is accommodated in the concave recess of the third compartment.

The terms 'compartments' and 'footprints' are used at various places in the present specification, the word compartment is meant to denote the 3D compartment, whereas the word 'footprint' denotes its 2D form on the sealing plane.

It is highly preferred that the three compartments and their footprints are placed It is preferred that the compartments are positioned in the sealing plane one after the other in circumferential direction. More preferably the three compartments are located in a ring like or chain like manner in the circumferential direction.

It is preferred that the compartments have a bulbous end portion and a tapered end portion. In a highly preferable embodiment when the three compartments are leaf-like, tear drop or similar shaped with a tapered top portion, a bulbous portion at bottom and a concave and convex side, the bulbous portion of one compartment sits in the concave recess of another and the tip of one compartment is close to the bottom bulbous portion of another.

It is preferred that the compartments have a shape in cross-section in the sealing plane (i.e. as defined by the peripheral sealing web and internal sealing web), which is teardrop-shaped. Suitably the teardrop-shape of the first side compartment is inverted with respect to the teardrop-shape of the second side compartment.

In a highly preferred embodiment the first compartment is large sized, the second compartment is small sized and the third compartment is medium sized.

It is preferred that the sealing web comprises a generally annular or square sealing web or skirt. The shape of the outwardly-facing edge of the peripheral sealing web generally corresponds to the cutting pattern used to separate the capsules prior release from the mould.

It is preferred that the sealing web comprises a peripheral sealing skirt, inter-compartment sealing webs between compartments thereby separating the compartments from one another and a central sealing web.

It is preferred that in the capsule of the present invention the capsule has a planar asymmetry across the sealing plane.

In embodiments the three compartment have substantially the same shape. The orientation of the of the three compartments can be same or different. It is preferred that the compartments have substantially the same shape and different orientations such that the first compartment shape is inverted with respect to the third compartment shape and the second compartment is arranged in the remaining space on the sealing plane.

It is preferred that the unit dose capsule of the present invention has a weight in the range of 5 to 60 g, preferably 5 to 40 gms and more preferably between 7 to 30 gms.

It is highly preferred that general shape of the footprints to the first, second and third compartments are identical.

It is preferred that combined volume of second and third compartments is from 0.8 to 2.3 times and more preferably from 0.9 to 2 times volume of the first compartment.

It is preferred that the sealing web comprises a peripheral sealing skirt inter-compartment sealing webs between compartments thereby separating the compartments from one another and a central sealing web.

It is preferred that the compartments are arranged radially around the central sealing web in a sealing plane.

It is preferred that the footprints to the first, second and third compartments are identical.

It is preferred that the compartments have an average surface extension ratio in the range of 1.5 to 4.

It is preferred that the average sealing width between compartments is in the range of 0.3 to 3 mm It is preferred that in the capsule of the present invention the compartments are arranged radially around the central sealing web on a sealing plane.

It is preferred that in the capsule of the present invention the capsule has a planar asymmetry across the sealing plane.

It is preferred that in the capsule of the present invention the footprint size of the compartment located in the sealing plane increases linearly from the smallest to the largest chamber.

It is preferred that in the capsule of the present invention the compartments are positioned one after the other in a circumferential direction.

It is preferred that in the capsule of the present invention the greatest height of the largest compartment to the smallest compartment is in the range of 1:05 to 3.

It is preferred that in the capsule of the present invention the footprints of the compartments located in the sealing plane has the largest dimension in the range of 10 mm to 60 mm.

It is preferred that in the capsule of the present invention the volume of the three compartments increases in a linear manner from the smallest to the largest compartment.

It is preferred that in the capsule of the present invention the volume of the substrate treatment composition of the three compartments increases in a linear manner from the smallest to the largest compartment.

Method

The present invention provides a method of making a capsule as described herein, wherein an array of moulds comprises at least a first and second column of moulds, and each mould comprises cavities, water-soluble film being provided in each cavity so as to provide recesses to receive a liquid composition, wherein the array of moulds moves in a process direction so as to pass under a filling station and the filling station dispenses liquid composition into the recesses of the moving moulds, wherein at least one filling device of the filling station fills a recess in a mould of the first column, moves substantially perpendicular to the process direction, and then fills a recess in a mould of the second column.

Volume

In embodiments the first compartment has a larger volume than each of the second and third compartments.

It is highly preferable that the first compartment is large sized accommodating the largest volume of substrate treatment composition, the second compartment is small sized accommodating the smallest volume of substrate treatment composition and the third compartment is medium sized accommodating substrate treatment composition more than the second compartment and less than the first compartment.

It is preferred that the height of the compartment having largest volume to that of the compartment having the smallest volume is in the range of 1:05 to 4.

Volume is conveniently calculated based on the volume of the corresponding cavity in the mould used to make the capsule. Volume includes both liquid composition and gas.

In embodiments the first compartment volume is ≥3 ml, suitably ≥4 ml, ≥5 ml, ≥6 ml, or ≥7 ml. In embodiments the first compartment volume is ≤15 ml, ≤13 ml, ≤12 ml, ≤10 ml or ≤9 ml. In embodiments, the volume of the central compartment is in the range 3 to 15 ml, 4 to 13 ml, 5 to 12 ml, 6 to 10 ml, or 7 to 9 ml.

In embodiments the second compartment volume is ≥1 ml, suitably ≥1.5 ml, ≥2 ml, ≥2.5 ml, or ≥2.75 ml. In embodiments the second compartment volume is ≤10 ml, ≤9 ml, ≤8 ml, ≤8.5 ml or ≤7 ml.

In embodiments, the volume of the central compartment is in the range 1 to 10 ml, 1.5 to 9 ml, 2 to 8 ml, 2.5 to 8.5 ml, or 2.75 to 7 ml.

In embodiments the third compartment volume is ≥3 ml, suitably ≥4 ml, ≥4.5 ml, ≥5.5 ml, or ≥6.5 ml.

In embodiments the third compartment volume is ≤10 ml, ≤9 ml, ≤8.5 ml, ≤8 ml or ≤7.5 ml. In embodiments, the volume of the central compartment is in the range 3 to 10 ml, 4 to 9 ml, 4.5 to 8.5 ml, 5.5 to 8 ml, or 6 to 7.5 ml.

In embodiments, the total compartment volume (total volume of all three compartments) is preferably in the range 10 to 36 ml, more preferably in the range of 12 to 30 ml, further more preferably in the range of 13 to 25 ml.

In a highly preferable embodiment the first compartment volume is in the range 5 to 12 ml; the second compartment volume in the range of 1.5 to 9 ml and the third compartment volume in the range of 4 to 9 ml.

It is preferred that combined volume of second and third compartments is from 0.8 to 2.3 times and more preferably from 0.9 to 2 times volume of the first compartment.

Each compartment is intended to house a substrate treatment composition and a gas. It is preferred each compartment is filled by at least 60% by volume of the substrate treatment composition, more preferably 72%, and most preferably 73%, it is further preferred that each compartment is filled at most to 95%, more preferably to 90% and most preferably to 88% of the total volume of the compartment. It is preferable that the substrate treatment compositions fills the volume of each compartment in the range of 70 to 95%, more preferably 72 to 90% and most preferably 73 to 88% of the total volume of the compartment.

It is preferred each compartment is filled by at least 3% by volume of the gas, more preferably 7%, and most preferably 13%, it is further preferred that each compartment is filled at most to 30%, more preferably to 28% and most preferably to 25% of the total volume of the compartment.

It is preferable that the gas fills the volume of each compartment in the range of 3 to 30%, more preferably 7 to 28% and most preferably 13 to 28% of the total volume of the compartment.

Dimensions and Shape

In embodiments each of the three compartments extends above the sealing plane such that the part of each compartment that is furthermost from the sealing plane, in a direction perpendicular to the sealing plane.

In embodiments each of the compartments extends ≥4 mm, ≥6 mm, ≥7 mm, ≥8 mm, or ≥9 mm, and suitably ≤30 mm, ≤25 mm or ≤22 mm above the sealing plane, as measured in a direction perpendicular to the sealing plane. As noted elsewhere, the terms "above" and "below" are relative not absolute terms and are used accordingly; here they can be understood to refer to opposite directions perpendicular to the sealing plane.

It is preferred that the capsule is cuboid or hexoid shaped, and more preferably cuboid shaped. It is preferable that the length and breadth of the cubiod range from 70 to 20 mm, more preferably from 60 to 30 mm and most preferably from 55 to 35 mm. It is further preferred that the depth of cubiod ranges between 7 to 30 mm, more preferably from 10 to 25 mm and most preferably from 12 to 20 mm.

The Three Compartments

In embodiments the outwardly-facing edges of each of the three compartments are curved, suitably substantially continuously curved.

In embodiments, the curvature and arrangement of said outwardly-facing edges is such as to define an approximate notional circle. In embodiments the curvature of at least a major portion of each of the outwardly-facing edges of each compartment substantially conforms to the curvature of the notional circle.

The configurations of the compartments described herein may assist in rapidly providing, in a washing machine, a wash liquor containing all three parts of the substrate treatment composition. Specifically, when placed approximately flat on top of e.g. dirty garments in the drum of a washing machine, the subsequent rising water level caused by (partial) filling of the drum with water at the start of the was cycle may cause simultaneous dissolution and/or dispersion of all three parts of the liquid composition from their respective compartments. Even if water is introduced into the drum in other ways, it is likely that all three compartments will be presented to the recently introduced water so that dissolution and dispersion of all three compartments and their contents begin at approximately the same time. Similarly, for those wash cycles whereby the drum is moved during the filing stage so as to agitate the garments, the capsule will, even if upturned, present all three compartments to the water.

A further advantage of the configurations described herein is that only two sheets of water-soluble film are required in order to provide three compartments. Furthermore, for each of the three compartments, a significantly greater surface area is presented such that more rapid dissolution might be achieved as compared to, for example, capsules that require three layers of water-soluble film and/or where compartments have a wall or significant surface in common, which wall or surface is not accessible to the water, resulting in slower and/or unequal dissolution and/or dispersion of the compositions, and the wall material, in use.

The Water-Soluble Film

As described herein two water-soluble films are used to make the capsule: a first film is applied to the cavity of the mould to form recesses, the recesses are filled with substrate treatment composition and gas and a second film is applied to the filled recesses so as to seal-in the substrate treatment composition and thereby form the compartments.

In embodiments the first film thickness (pre-thermoforming) is from 50 to 150 micrometer, from 60 to 120 micrometer, or from 80 to 100 micrometer. After capsule manufacture generally the average thickness of the first film will be from 30 to 120 micrometer, or from 50 to 100 micrometer and more preferably from 70 to 100 micrometer.

The second film is typically of a similar type to that used for the first film, but preferably slightly thinner. Thus, in embodiments, the second film is thinner than the first film. In embodiments the ratio of thickness of the first film to the thickness of the second film is from 1:1 to 2:1.

It is preferred that the second film thickness (pre-thermoforming) is from 20 to 100 micrometer, from 50 to 90 micrometer, or from 60 to 85 micrometer.

It is preferred that the water-soluble film comprises polyvinyl alcohol or a polyvinyl alcohol derivative. Such film materials can for example be produced by a process of blowing or casting. The water-soluble film can also contain plasticizers, antifoams, anti-oxidants, surfactants, perfumes and the like.

Sealing Web

It is preferred that the sealing web comprises a generally annular or square sealing web encompassing all three compartments preferably positioned in the sealing plane one after the other preferably in circumferential direction.

Two sheets of water soluble film are sealed together to form a sealing web lying on a sealing plane, forming a sealing web, the sealing web comprising a peripheral sealing skirt preferably a generally annular or square sealing web encompassing all three compartments, inter-compartment sealing webs between compartments thereby separating the compartments from one another and a central sealing web, wherein the average width of the inter-compartment sealing webs is in the range of 0.3 to 3 mm.

Peripheral Sealing Web

In embodiments the peripheral sealing web or skirt has an area of $\leq 1500$ mm$^2$, $\leq 1400$ mm$^2$, $\leq 1300$ mm$^2$, $\leq 1200$ mm$^2$, $\leq 1100$ mm$^2$, or $\leq 1000$ mm$^2$. A smaller skirt area (also known as flange area) is desirable for the reasons explained herein, namely reduced wastage and reduced likelihood of undesirable residue, as well as improved consumer perception and handling experience.

In embodiments the maximum width of the skirt is $\leq 12$ mm, $\leq 10$ mm, $\leq 9$ mm, $\leq 8$ mm, or $\leq 7$ mm. The width of the peripheral sealing web is, at any one location on the periphery of the capsule, the distance between the outermost edge of the compartment that defines the inner edge of the annular web at the said location and the outermost edge of the peripheral web at the said location, measured radially on a notional line extending from the centre of the capsule in the sealing plane, to the said outermost edge.

Whilst a narrower skirt is desirable for aesthetic and performance reasons, it is nevertheless important that a robust seal is provided and so, in embodiments the maximum width of the peripheral sealing web is $\geq 1$ mm, $\geq 2$ mm or $\geq 3$ mm.

In embodiments where the outwardly-facing edge of the peripheral sealing web is a hexagon, suitably the width of the annular sealing web along at least a major portion of each side of the hexagon is $\leq 7$ mm, $\leq 6$ mm, $\leq 5$ mm, or $\leq 4$ mm. Suitably the said major portion of each side of the hexagon is at least 55% of the length of the side of the hexagon, preferably at least 60%. In this way, the width of the annular sealing web (skirt) can be narrow around the majority of the perimeter of the capsule, further assisting in providing a pleasing tactile and visual cue to the consumer as well as minimising the amount of water-soluble film used.

In embodiments where the outwardly-facing edge of the peripheral sealing web is a square, suitably the width of the annular sealing web each side of the square is $\leq 7$ mm, $\leq 6$ mm, $\leq 5$ mm, or $\leq 4$ mm.

Indeed, more generally and independently of the shape of the outwardly-facing edge of the peripheral sealing web, it is preferred that the width of the peripheral sealing web is, for the major portion of the perimeter of the capsule, $\leq 7$ mm, $\leq 6$ mm, $\leq 5$ mm, or $\leq 4$ mm. Suitably the said major portion of the perimeter of the capsule is at least 55% of the perimeter length, preferably at least 60%.

In embodiments the outwardly-facing edge of the peripheral sealing web is a square or a hexagon. The hexagon can be a regular or an irregular hexagon. Suitably the hexagon is a regular hexagon (all sides having equal length).

The peripheral sealing web or skirt defining the periphery of the capsule and hence provides the capsule with a shape such as a square or a hexagon shape.

In embodiments the side length for each side of the hexagon is ≥20 mm, ≥25 mm, ≥28 mm, ≥30 mm, ≥32 mm, ≥34 mm, ≥35 mm or ≥37 mm. In embodiments the side length for each side of the hexagon is ≤50 mm, ≤45 mm, ≤43 mm, ≤41 mm, or ≤40 mm. In embodiments the side length for each side is in the range 30 mm to 45 mm, 32 mm to 42 mm, or 35 mm to 40 mm.

As noted above, suitably the hexagon is a regular hexagon and in embodiments the regular hexagon has a side length in the range 37 mm to 42 mm, for example about 39 mm.

Other shapes are also envisaged, for example a square, circle and oval.

Sealing Width

The inter-compartment sealing webs between compartments serve to separate the compartments from one another. Sealing width is the sealing web space between the different compartments or compartment footprints and is important to hold the compartments together in the sealing plane. It is preferred to have an average sealing width of the inter-compartment sealing web ≤5 mm, ≤4 mm, ≤3.5 mm or ≤3 mm. It is further preferred to have sealing width of the peripheral sealing web ≥0.2 mm, ≥0.3 mm, ≥0.4 mm, ≥0.5 mm, ≥0.6 mm, ≥0.7 mm. It is preferable to have the average sealing width in the range of 0.7 to 5 mm more preferably in the range of 0.3 to 5 mm, further more preferably in the range of 0.3 to 4 mm, more preferably 0.4 to 3.5 mm, more preferably 0.5 mm to 3 mm, and most preferably from 0.7 mm to 3 mm.

Surface Extension Ratio

The 'surface extension ratio' is the surface area of the film above the sealing plane to surface area of footprint the compartments located in the sealing plane. The average surface extension ratio is the average surface extension ratio of the three compartments. It was observed that the surface extension ratio plays an important role in the quality and efficacy of the unit dose capsule.

It is preferred to have an average surface extension ratio 4.5, 4, 3 or 2.8. It is further preferred to have sealing width of the peripheral sealing web ≥0.8, ≥1, ≥1.5, ≥1.7, ≥1.8, ≥2. It is preferable to have the average surface extension ratio in the range of 0.8 to 4 more preferably in the range of 1 to 4.5, further more preferably in the range of 1.5 to 4, more preferably still from 1.5 to 3, even more preferably 1.8 to 3, and most preferably from 2 to 2.8.

Footprint Area

The foot print area is area on the sealing plane covered by foot print of respective compartments The inventors have surprisingly found that keeping the combined footprint area of the second and the third compartments from 0.8 to 2.5 times the area of the footprint of the first compartment has many advantages than having substantially equal sized compartments or choosing the footprint on a random basis. It was seen that the unit dose capsule according to the present invention was much stable during production, transport and consumer usage as the capsule was more sturdy, at the same time, the capsule acquired appropriate properties to release the contents of the compartments at just the appropriate time during the wash cycle. It was observed that deviation from the sizing of the footprints according to the present invention lead to unsatisfactory wash results and if the footprint of combined footprint area of the second and the third compartments is lower than 0.8 or higher than 2.5 times the area of the footprint of the first compartment, the resulting capsule is a floppy capsule which is highly susceptible to folding and consequently leading to leakages and breakage and poor wash results.

It is preferred to have combined footprint area of the second and the third compartments ≤3, ≤2.8, ≤2.5 or ≤2.3 times the area of the footprint of the first compartment. It is further preferred to have combined footprint area of the second and the third compartments ≥0.8, ≥1, ≥1.3, ≥1.5 times the area of the footprint of the first compartment. It is preferable combined footprint area of the second and the third compartments to the footprint of the first compartment is from 0.8 to 3.0, more preferably 0.8 to 2.8 and most preferably 0.8 to 2.5 times the area of the footprints of the second and the third compartments combined.

Thermoforming Process

The present invention also provides a method of producing a unit dose capsule (101) for treatment of a substrate, the method comprising steps:

a. placing a first sheet of water-soluble polyvinyl alcohol film over a mould having sets of cavities, each set comprising three cavities arranged on the sealing plane one after the other in circumferential direction such that the combined footprint area of the second and the third compartments is from 0.8 to 2.5 times the area of the footprint of the first compartment;

b. heating and applying vacuum to the film to mould the film into the cavities and hold it in place to form three recesses in the film; a first recess, the second recess, and a third recess, the three recesses being connected to respective side recesses by the film;

c. filling three different parts of a substrate treatment composition into the three recesses, the three parts together forming a full substrate treatment composition;

d. sealing a second sheet of film to the first sheet of film across the formed recesses to form the sealing web comprising a peripheral sealing skirt and inter-compartment sealing webs; and e. cutting between the capsules so that a series of three compartment capsules are formed, each capsule containing a part of a substrate treatment composition in three compartments.

As discussed herein, it is preferred that the cutting (step (e)) suitably includes cutting according to a hexagonal or square cutting pattern. In embodiments this step includes providing a cutter configured to provide simultaneous or sequential cuts corresponding to each of the six sides of the hexagon or four sides of a square. In embodiments, the cutter has 3 pairs of parallel blades to effect cutting of respective pairs of opposing sides of the hexagon or has 2 pairs of parallel blades to effect cutting of respective pairs of opposing sides of the square.

Sealing can be done by any suitable method for example heat-sealing, solvent sealing or UV sealing. Particularly preferred is water-sealing. Water sealing may be carried out by applying moisture to the second sheet of film before it is sealed to the first sheet of film to form the seal areas.

A preferred thermoforming process uses a rotary drum on which the forming cavities are mounted. A vacuum thermoforming machine that uses such a drum is available from Cloud LLC. The capsules according to the invention could also be made by thermoforming on a linear array of cavity sections. Machines suitable for that type of process are available from Hoefliger. The following example description is focused onto the rotary process. A skilled person will appreciate how this would be adapted without inventive effort to use a linear array process.

Substrate Treatment Composition

The substrate treatment composition may be any type of cleaning composition for which it is desirable to provide a dose thereof in a water-soluble capsule. The unit dose capsules comprise three different parts of the substrate treatment composition. All three parts are preferably liquid.

Suitable substrate treatment composition that may be split into different components for use in the present invention include those intended for laundry (fabric cleaning, softening and/or treatment) or machine dishwashing. Preferred are laundry compositions, particularly laundry cleaning compositions.

The three compartment capsules comprise three different parts of a substrate treatment composition which, when combined, make up the full substrate treatment composition. By that is meant that the formulation of each of the parts of the substrate treatment composition is different either in its physical form (e.g. viscosity), its composition or its colour. Sometimes it will be sufficient to only have minor differences between the parts of the substrate treatment composition e.g. colour, perfume etc. Often, however, it will be advantageous to have visible differences.

Anyone of the compartments may comprise sequestrants, enzymes, bleach catalysts, perfume, builders etc. and other compartments may be filled with liquids more preferably substrate treatment compositions. By filled it is meant that the compartment contains liquid and gas. The presence of the gas bubble provides some protection from compression of the compartment due to its compressibility. The gas is preferably air trapped in the compartment during manufacture.

The liquid-containing compartments are separated by the sealing web as described herein.

Preferred liquids have a viscosity in the range 100 to 1000 cPs, more preferably between 200 to 800, further preferably in the range of 250 to 700 and most preferably in the range of 300 to 600.

The liquid composition in each of the compartments preferably has a low water content of less than 20 wt %, more preferably from 0.5 to 18 wt % water, most preferably from 1 to 17 wt %.

Surfactant

The substrate treatment composition may comprise one or more organic surfactants. Many suitable detergent-active compounds are available and are fully described in the literature, for example, in "Surface-Active Agents and Detergents", Volumes I and II, by Schwartz, Perry and Berch. The organic surfactant may be anionic (soap or non-soap), cationic, zwitterionic, amphoteric, nonionic or mixture of two or more of these. The preferred organic surfactants are mixtures of soap, synthetic non-soap anionic and non ionic compounds optionally with amphoteric surfactant.

Anionic surfactant may be present in an amount from 0.5 to 50 wt %, preferably from 2 wt % or 4 wt % up to 30 wt % or 40 wt % of the substrate treatment composition. Suitable examples include alkyl benzene sulphonates, particularly sodium linear alkyl benzene sulphonates having an alkyl chain length of C5-C15; olefin sulphonates; alkane sulphonates; dialkyl sulphosuccinates; and fatty acid ester sulphonates.

Suitable nonionic surfactant compounds include in particular the reaction products of compounds having a hydrophobic group and a reactive hydrogen atom, for example, aliphatic alcohols, acids, amides or alkyl phenols with alkylene oxides, especially ethylene oxide. Specific nonionic surfactant compounds are alkyl (C8-22) phenol-ethylene oxide condensates, the condensation products of linear or branched aliphatic C8-20 primary or secondary alcohols with ethylene oxide, and products made by condensation of ethylene oxide with the reaction products of propylene oxide and ethylene-diamine.

In a fabric washing substrate treatment composition, these organic surfactants preferably comprise 5 to 50 wt % of the substrate treatment composition. In a machine dishwashing composition, organic surfactant is likely to constitute from 0.5 to 8 wt % of the substrate treatment composition and preferably consists of nonionic surfactant, either alone or in a mixture with anionic surfactant.

Builders and Sequestrants

The substrate treatment composition may contain a so-called detergency builder which serves to remove or sequester calcium and/or magnesium ions in the water. Soluble builder may be added to the liquid composition. For example sodium citrate or a soluble sequestrant, for example, Dequest 2066, which may also assist with stabilising the liquid.

The builder or sequestrant material is preferably fully soluble so as to eliminate the possibility of unwanted and unsightly residues on fabrics. For that reason alkali metal aluminosilicates are not favoured.

Non-phosphorus water-soluble detergency builders may be organic or inorganic. Inorganic builders that may be present include alkali metal (generally sodium) carbonate; while organic builders include polycarboxylate polymers, such as polyacrylates, acrylic/maleic copolymers, and acrylic phosphonates, monomeric polycarboxylates such as citrates, gluconates, oxydisuccinates, glycerol mono-di and trisuccinates, carboxymethyloxysuccinates, carboxymethyloxymalonates, dipicolinates and hydroxyethyliminodiacetates. Electrolytes such as sodium carbonate are not preferred due to the way they suppress the solubility of polyvinylalcohol.

Bleach System

The substrate treatment composition may contain a bleach system. This preferably consists of an air bleaching catalyst. For example the catalyst being a ligand of the formula (I) complexed with a transition metal, selected from Fe(II) and Fe(III),

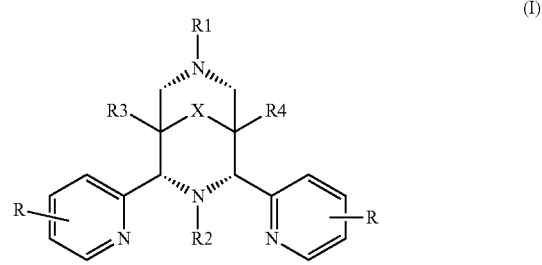

(I)

Where R1 and R2 are independently selected from:
C1-C4-alkyl,
C6-C10-aryl, and,
a group containing a heteroatom capable of coordinating to a transition metal, wherein at least one of R1 and R2 is the group containing the heteroatom; preferably at least one of R1 or R2 is pyridin-2-ylmethyl. More preferably the catalyst is one in which R1 is pyridin-2-ylmethyl. Most preferably R1 is pyridin-2-ylmethyl and R2 is methyl;

R3 and R4 are independently selected from hydrogen, C1-C8 alkyl, C1-C8-alkylene-O-C1-C8-alkyl, C1-C8-alkylene-O-C6-C10-aryl, C6-C10-aryl, C1-C8-hydroxyalkyl, and —(CH2)nC(O)OR5;

wherein R5 is independently selected from: hydrogen, C1-C4-alkyl, n is from 0 to 4, and mixtures thereof; preferably R3=R4=—C(O)OMe and, each R is independently selected from: hydrogen, F, Cl, Br, hydroxyl, C1-C4-alkyO—, —NH—CO—H, —NH—CO-C1-C4-alkyl, —NH2, —NH-C1-C4-alkyl, and C1-C4-alkyl; preferably each R is hydrogen, X is selected from C=O, —[C(R6)2]y- wherein Y is from 0 to 3, preferably 1, each R6 is independently selected from hydrogen, hydroxyl, C1-C4-alkoxy and C1-C4-alkyl (II)

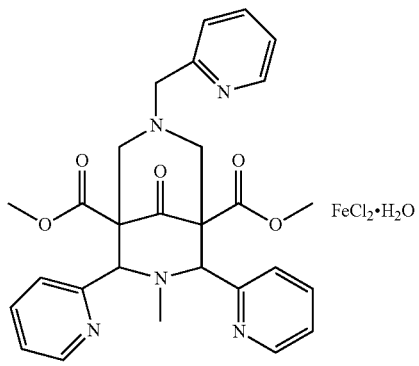

preferably X is C=O.

Most preferably the catalyst is ([Fe(N2py3o)Cl]Cl) with structure (II):

Also known as Iron(1+), chloro[rel-1,5-dimethyl (1 R,2S, 4R,5S)-9,9-dihydroxy-3-methyl-2,4-di(2-pyridinyl-kN)-7-[(2-pyridinyl-kN)methyl]-3,7-diazabicyclo[3.3.1]nonane-1, 5-dicarboxylate-kN3, kN7]-, chloride (1:1), (OC-6-63)[CAS Registry Number 478945-46-9].

To avoid possible gassing of ingredients it is preferred to avoid the use of persalt or peracid bleaching species in the capsules.

Further Optional Ingredients

Detergency enzymes may be employed in the compositions.

The compositions may also contain a fluorescer (optical brightener), for example, Tinopal (Trade Mark) DMS or Tinopal CBS available from Ciba-Geigy AG, Basel, Switzerland. Tinopal DMS is disodium 4,4'bis-(2-morpholino-4-anilino-s-triazin-6-ylamino) stilbene disulphonate; and Tinopal CBS is disodium 2,2'-bis-(phenylstyryl) disulphonate.

An antifoam material is advantageously included when organic surfactant is present; especially if the substrate treatment composition is primarily intended for use in front-loading drum-type automatic washing machines. Soap is a suitable antifoam.

Further ingredients which can optionally be employed in laundry substrate treatment compositions of the invention include antiredeposition agents such as sodium carboxymethylcellulose, straight-chain polyvinyl pyrrolidone and the cellulose ethers such as methyl cellulose and ethyl hydroxyethyl cellulose, fabric-softening agents; perfumes; and colorants or coloured speckles.

Use of Capsules

The capsules described herein are suitable for use in a cleaning method, suitably a laundry method. Thus, a further aspect of the present invention provides use of capsules as described herein in a method of cleaning, suitably a laundry method. Suitably the method includes placing the capsule in the drum of a washing machine prior to commencement of a wash cycle.

The unit dose capsules are particularly suitable for use in (fabric) washing machines and in dishwashing machines amongst other applications. They can also be used in manual laundry and dishwashing operations. In use the capsules according to the invention are preferably, and conveniently, placed directly into the liquid which will form the wash liquor or into the area where this liquid will be introduced. The capsule dissolves on contact with the liquid, thereby releasing the substrate treatment composition from the separate compartments and allowing them to form the desired wash liquor.

It is a particular advantage of the capsules that they may alternatively be placed into a dispensing drawer of the type found in automatic laundry washing machines where water flows through the drawer. Surprisingly the capsules have been found to dispense effectively from such drawers.

Package Containing Capsules

The unit dose capsules described herein can be provided in any suitable packaging, for example a box or other container. Thus, a further aspect of the present invention provides a package containing a plurality of capsules as described herein.

Method of Making Capsule

The unit dose capsules described herein can be made by any suitable method and particularly by a method as described herein. Thus a further aspect of the present invention provides a method of making capsule as described herein.

Capsule Obtained by Method of Making

A further aspect of the present invention provides a unit dose capsule obtained by the method of making said capsule as described herein.

Mould/Cavity Section

Moulds, or cavity sections, are described herein and are characterised in having cavities configured so as to provide the unit dose capsules described herein. Thus, a further aspect of the present invention provides a mould or cavity section for use in making a capsule as described herein, characterised in that the cavities of the mould or cavity section configured so as to produce the shape and configuration of compartments of those capsule.

It is preferred that there is provided a mould for use in a process of making capsules as described herein, or for mounting to the rotating surface of a rotary cylindrical drum as described herein, wherein the mould comprises a set of three cavities preferably positioned in the sealing plane one after the other preferably in circumferential direction, and wherein the mould is hexagonal so as to permit tessellation of a plurality of identical moulds so as to form a tessellated array of moulds.

Drum with Array of Hexagonal Moulds/Cavity Section

As described herein, the hexagonal shape of the capsule, and the associated moulds/cavity section permits tessellation when arranged on a surface and that in turn minimises wastage of water-soluble film. Thus, a further aspect of the present invention provides a rotary cylindrical drum comprising an array of hexagonal moulds or cavity sections as described herein.

In embodiments the rotary cylindrical drum having an outer surface which in use is a rotating surface that rotates in a process direction, wherein the outer surface has mounted thereon an array of moulds, each mould having a hexagonal shape, the moulds being tessellated such that each hexagonal-shaped mould has a pair of opposing sides aligned perpendicular to the process direction Use of Hexagonal Cutting Pattern in Capsule Production Hexagonal shaped capsules and their production is described herein. Thus, a further aspect of the present invention provides use of a hexagonal cutting pattern in the manufacture of multi-compartment, suitably unit dose capsules.

Combinations of Aspects

A number of proposals and aspects are described herein, which proposals and aspects are intended to be combined to achieve improved or cumulative benefits. Thus, any one aspect may be combined with any other aspect. Similarly the optional features associated with any one of the aspects may apply to any one of the other aspects.

DETAILED DESCRIPTION OF FIGURES

The invention will now be further described with reference to the following non-limiting embodiments and with reference to the drawings, of which:

Each of the figures will now be discussed in turn.

Figure 4:
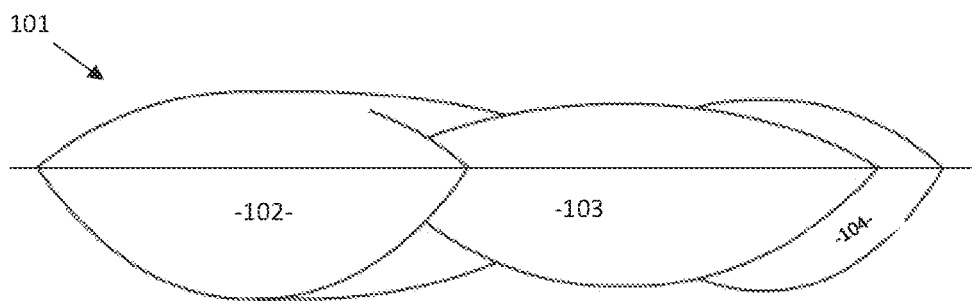
FIG. 4 is a side elevational view of the capsule.

FIG. 1 is a perspective view of the capsule in accordance with the present invention. FIG. 1 illustrates a capsule according to the present invention. Coordinate axes in the x, y and z direction are shown in FIG. 4 to assist in the explanation of the relative arrangement of features of the capsule. Indeed, FIG. 1 is discussed here to aid understanding of the subsequent discussion of the shape and configuration of the three-compartment capsule of the present invention. The capsule 101 of FIG. 1 comprises first compartment 102, second compartment 103, and third compartment 104. The three compartments the three compartments are arranged on the sealing plane around a central axis in the width direction (x direction) across the capsule and positioned one after the other in circumferential direction. Each of the three compartments 102, 103, 104 is elongate in that it has a length (y direction) that is greater than its width (x direction). The long axis of each compartment lies in the y direction.

The sealing web 105 is formed from fusing, e.g. thermoforming, a first and second sheet of water-soluble film during manufacture of the capsule. The sealing web 105 comprises an annular sealing web or skirt 106 that lies in the x-y plane and is referred to herein as the sealing plane. The sealing web 105 includes inter-compartment sealing webs 1024, 1034, 1023 and a central sealing web 10234. The average sealing width that is defined throughout the invention is preferably the width of the inter-compartment sealing web.

Each of the three compartments 102, 103, 104 extends similarly above and below (z direction) the sealing plane.

It follows that reference herein to the width of a feature (e.g. width of a compartment) is a reference to the dimension in the x direction, that being parallel to the sealing (x, y) plane. Reference herein to the length of a feature (e.g. length of a compartment, or the lengthwise direction or long axis of a compartment) is a reference to the dimension (direction, axis) in the y direction. Reference herein to depth of a feature, or to a feature being, or extending, "above" or "below" is a reference to the dimension (direction, axis) in the z direction, i.e. perpendicular to the sealing plane (x-y plane). Naturally, the terms "above", "below", "up", "down", etc are relative not absolute terms and they are used accordingly herein, and to aid understanding.

Figure 2:
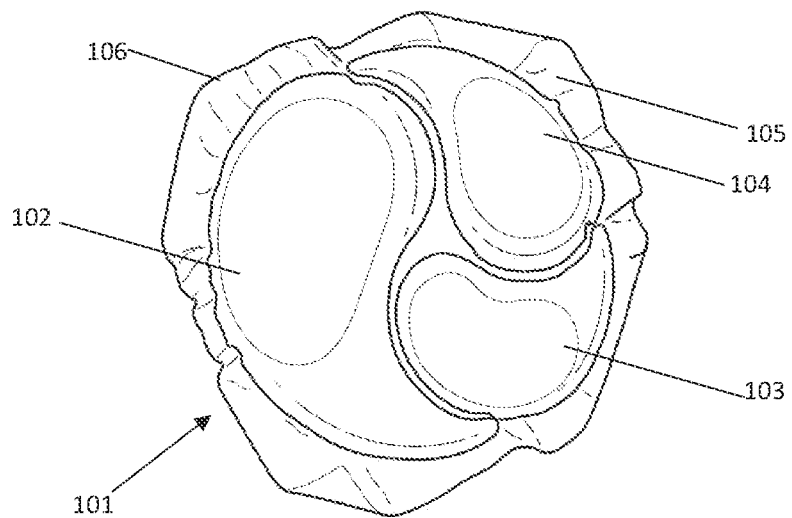
FIG. 2 is a top plan view of the capsule in accordance with the present invention.

FIG. 2 is a top plan view of the capsule in accordance with the present invention and same as discussed in FIG. 1.

Figure 3:
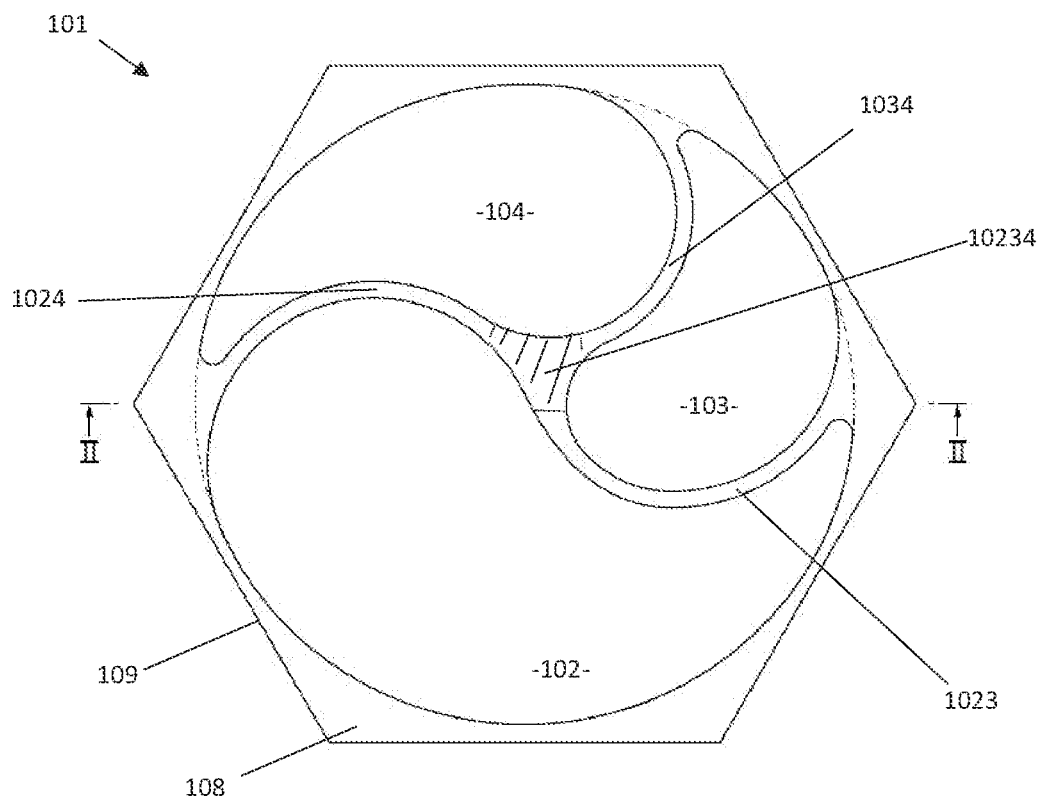
FIG. 3 is a cross-sectional view of the capsule illustrated in FIG. 1, taken along line II-II in FIG. 1.

FIG. 3 is a cross-sectional view of the capsule illustrated in FIG. 1, taken along line II-II in FIG. 1; there is illustrated a further capsule 101 in accordance with the present invention, which capsule is largely identical to that the capsule shown in FIG. 1.

The capsule 101 comprises three discrete compartments 102, 103, 104, each of which defines a respective substantially liquid-tight and hermetically sealed chamber intended to contain substrate treatment composition. The three compartments the three compartments are arranged in sealing plane around and positioned one after the other in circumferential direction.

As will be appreciated, each compartment 102, 103, 104 is defined between the upper and lower layers of PVA film, and is sealed around its respective periphery by the fusion of the two layers of film therearound. More particularly, and having regard to FIG. 3, it will be noted that the upper and lower film layers are fused together around the three compartments to form a generally annular web 108 extending around all of the compartments 102, 103, 104, and which has a hexagonal outer edge 109, as defined by the aforementioned cutting process. The upper and lower film layers are also fused together to form a pair of thin additional webs 1024, 1034, 1023 and 10234 which are formed integrally with the annular web 508 and which extend across the capsule 101 in spaced-relation to one another. Each of the additional webs 1024, 1034, 1023 and 10234 serve to separate the three compartments from one another. The sealing web 1024 separated 102 and 104 compartment, the sealing web 1034 separated 103 and 104 compartment, sealing web 1023 separated 102 and 103 compartment and the seeking web 10234 forms the central sealed portion around which compartments 102, 103 and 104 are arranged.

Figure 5:
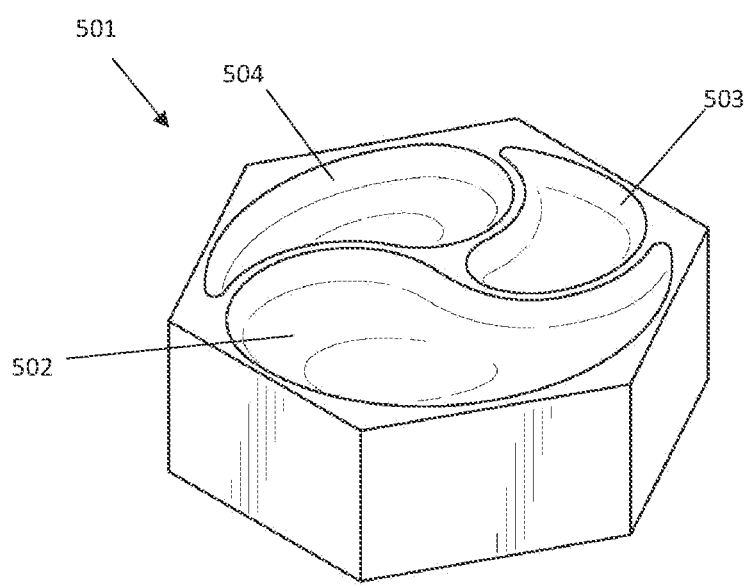
FIG. 5 is a perspective view of a three-cavity mould in accordance with the present invention.

As will be noted most clearly from FIG. 5, the first compartment 502 is substantially larger than the two compartments 103 and 104. The second compartment 103 is the small and the third compartment 104 is the medium sized compartment. In the particular embodiment illustrated, the first compartment 102 is configured to hold a larger volume of substrate treatment composition than each of the two side compartments 103 and 104.

As shown most clearly in FIG. 5, the compartments have a bulbous end portion and a tapered end portion. The three compartments 102, 103 and 104 are tear drop shaped with a tapered top portion, a bulbous portion at bottom and a concave and convex side. The first compartment 102 is seen to have droplet shape having a tapered end portion top, a bulbous portion at its bottom, a concave recess facing central axis of the capsule and a convex portion facing the periphery of the capsule; the second 103 is shaped so as conform to and be at least partially located in a concave recess of the first compartment 102, and the third one 104 is so located as to accommodate at least partially the bulbous portion of the first compartment 102.

Turning now to consider FIG. 4, the capsule 101 is illustrated in side profile.

Production

FIG. 5 shows a mould or cavity section 501 used to thermoform a first film to manufacture a unit dose capsule of the present invention. The mould 501 has a hexagonal shape (six equal length external side walls 605 defining a hexagon), which permits it to tessellate in a hexagonal array of identical moulds. The first mould 502 has a is seen to have droplet shape having a tapered end portion top, a bulbous portion at its bottom, a concave recess facing central axis of the capsule and a convex portion facing the periphery of the capsule; the second mould 503 is shaped so as conform to and be at least partially located in a concave recess of the first compartment mould 502, and the third mould 504 is so located as to accommodate at least partially the bulbous portion of the first compartment mould 502. Each cavity is provided with a number of ducts (not shown) to which may be applied a vacuum.

The composition of the first compartment is formulated, including provision of suitable dyes, to provide a green colour. The second compartment is formulated, including provision of suitable dyes, to provide a pink colour. The third compartment is formulated, including provision of suitable dyes, to provide a blue colour. The colours identified herein are mere for exemplary purposes and any suitable colour dyes may be used as appropriate.

The filling station provides three filing nozzles, each one addressing the three compartments.

The invention claimed is:

1. A method of producing a unit dose capsule (101) for treatment of a substrate, the method comprising steps:
   a. placing a first sheet of water-soluble polyvinyl alcohol film over a mould having sets of cavities, each set comprising three cavities arranged on a sealing plane one after the other in circumferential direction such that a footprint area of each of a second and a third compartment is from 0.8 to 2.5 times the area of a footprint of a first compartment;
   b. heating and applying vacuum to the film to mould the film into the cavities and hold it in place to form three recesses in the film; a first recess, a second recess, and a third recess, the three recesses being connected to respective side recesses by the film;
   c. filling three different parts of a substrate treatment composition into the three recesses, the three parts together forming a full substrate treatment composition, wherein the first recess accommodates the largest volume of substrate treatment composition and is filled with a first part of the substrate treatment composition and 13 to 28% gas, the second recess accommodates the smallest volume of substrate treatment composition and is filled with a second part of the substrate treatment composition and 13 to 28% gas, and the third recess accommodates substrate treatment composition more than the second compartment and less than the first compartment and is filled with a third part of the substrate treatment composition and 13 to 28% gas;
   d. sealing a second sheet of film to the first sheet of film across the formed recesses to form a sealing web comprising a peripheral sealing skirt and inter-compartment sealing webs; and
   e. cutting between the capsules so that a series of three compartment capsules are formed, each capsule containing a part of a substrate treatment composition in three compartments.

2. The method according to claim 1, wherein the sealing web comprises a peripheral sealing skirt, inter-compartment sealing webs between compartments thereby separating the compartments from one another and a central sealing web.

3. The method according to claim 1, wherein the compartments are arranged radially around a central sealing web in a sealing plane.

4. The method according to claim 1, wherein general shape of the footprints to the first, second and third compartments are identical.

5. The method according to claim 1, wherein compartments have an average surface extension ratio in the range of 1.5 to 4.

6. The method according to claim 1, wherein the capsule has a planar asymmetry across the sealing plane.

7. The method according to claim 1, wherein footprint size of each compartment located in the sealing plane increases linearly from smallest to largest.

8. The method according to claim 1, wherein the compartments are positioned one after the other in a circumferential direction.

9. The method according to claim 1, wherein the greatest height of the largest compartment to the smallest compartment is in the range of 1:05 to 3.

10. The method according to claim 1, wherein the footprint of each compartment located in the sealing plane has a largest dimension in the range of 10 mm to 60 mm.

11. The method according to claim 1, wherein volume of the three compartments increases in a linear manner from the smallest to the largest compartment.

12. The method according to claim 1, wherein volume of the substrate treatment composition of the three compartments increases in a linear manner from the smallest to the largest compartment.

13. The method according to claim 1, wherein combined volume of second and third compartments is from 0.8 to 2.3 times volume of the first compartment.

* * * * *